United States Patent Office 3,048,589
Patented Aug. 7, 1962

3,048,589
5-URACILSULFONIC ACID DERIVATIVES
Ross R. Herr, Wheaton, and Takashi Enkoji and Thomas J. Bardos, Chicago, Ill., assignors, by mesne assignments, to Armour Pharmaceutical Company, a corporation of Delaware
No Drawing. Filed Mar. 23, 1955, Ser. No. 496,346
5 Claims. (Cl. 260—256.5)

This invention relates to novel uracil derivatives, and more particularly to 5-uracilsulfonic acid derivatives such as 5-uracilsulfonyl halides, 5-uracilsulfonyl esters and 5-uracilsulfonamides, and to a method of preparing such derivatives.

The compounds of the present invention can be characterized by a uracil nucleus with a hexavalent sulfur atom attached to the 5 carbon position, and by having attached to this sulfur atom at least 2 oxygen atoms. This class of compounds can be represented as having the formula

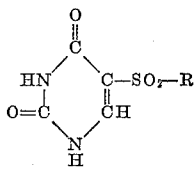

wherein R is selected from the group consisting of halogen, oxygen, sulfur and nitrogen. Also, the class can include the metal salts of these compounds. When R represents an oxygen, sulfur or nitrogen atom, such atom may have attached thereto hydrogen or an organic radical such as alkyl, aryl or heterocyclic radicals. These compounds are useful as intermediates in the synthesis of chemotherapeutics.

These uracil derivatives can be prepared by a method involving the reaction of a halosulfonic acid and a uracil material. The product of this reaction is a 5-uracilsulfonyl halide. Although the halogen component of the acid reactant can be fluorine or bromine, better results are obtained when this component is chlorine. When the chlorosulfonic acid reactant is employed in this method, the product thereof is a 5-uracilsulfonyl chloride. Any uracil material capable of reacting with a sulfonyl halide to produce a new carbon-sulfur bond at the 5 carbon position in the uracil nucleus can be employed in this method. This uracil material may have attached at the 1 and 3 positions any alkyl or substituted alkyl radical, e.g methyl or chloromethyl radicals. The 6 carbon position of the uracil nucleus may have attached thereto any alkyl radical or substituted alkyl radical in which the substituents are non-interfering with chlorosulfonation of the 5 carbon in the uracil nucleus. Also, this 6 carbon may have attached thereto halogen, oxygen, sulfur or nitrogen, and when the substituent on the 6 carbon is an oxygen, sulfur or nitrogen atom, such atom may have attached thereto hydrogen or an organic radical such as alkyl, aryl or heterocyclic radicals. Further, the 2 position of the uracil nucleus may have attached thereto a sulfur atom, i.e. the uracil material may be thiouracil, and such substituent sulfur atom may in turn have attached thereto any alkyl or substituted alkyl radical. An especially desirable product results when this uracil reactant is uracil.

In the preferred practice of this method, chlorosulfonic acid and a uracil material can be reacted in the ratio of at least 5 moles of chlorosulfonic acid per mole of uracil material to form 5-uracilsulfonyl chloride. Better results can be obtained when from 9 to 11 moles of chlorosulfonic acid are employed per mole of uracil material. The temperature for this reaction can be at least about 60° C., and the time period for completing the reaction at this temperature can vary from about 6 hours to several days. For example, when the reaction is carried out at a temperature of about 120° C., completion thereof will be obtained in about 8 hours. On the other hand, at a lower temperature, e.g. 60° C., the time required to complete the reaction may be from 24 to 36 hours. Consequently, it should be understood that as the temperature of the reaction is increased, the time period required for completing the reaction can be decreased. The halosulfonic acid constituent of the reaction mixture may form the solvent medium for the reaction.

The uracilsulfonic acid derivatives of this invention can be obtained by reacting a uracilsulfonyl halide, such as uracilsulfonyl chloride, with a suitable alcohol, amine or water. For example, when the uracilsulfonyl chloride is reacted with aniline the product thereof can be a 5-uracilsulfonanilide, and when this reactant is dimethylamine the product is a 5-(N,N-dimethylsulfamido)-uracil. Further, when this reactant is phenol the product thereof is a phenyl 5-uracilsulfonate.

These uracilsulfonyl halides, such as uracilsulfonyl chloride, can be subjected to a reduction reaction to produce 5-mercaptouracil and derivatives thereof. For example, 5-uracilsulfonyl chloride can be contacted with a metallic reducing agent, such as zinc dust, in an acidic medium. This 5-mercaptouracil reduction product can be converted to 5-uracilyldisulfide by an oxidation reaction involving, contacting the 5-mercaptouracil and iodine in a strong aqueous alkali medium or refluxing with aqueous sulfuric acid.

This invention can be further illustrated by the following examples:

Example I

To 11.2 gms. of uracil was added 105 gms. of chlorosulfonic acid. The temperature of the resulting mixture immediately rose to 40 to 50° C. After the initial reaction had subsided, this mixture was heated to a temperature of 120° C., with stirring, for a period of 8 hours. Then, the mixture was cooled, and carefully poured onto 500 gms. of crushed ice, while the ice was undergoing vigorous agitation. When the ice had melted, the precipitate formed in the aqueous mixture was collected on a Büchner filter and washed with a small volume of water. This washed precipitate was dried, and the resulting product obtained in a yield of 10.4 gms. This dried product was purified by recrystallization from glacial acetic acid. This product may also be purified by precipitation from an acetone solution by the addition thereto of benzene. The purified product was identified as 5-uracilsulfonyl chloride having a melting point of more than 300° C.

The analytical results obtained with this product, calculated on the basis of a formula for the compound of $C_4H_3ClN_2O_4S$, were as follows:

|  | C | H | Cl | N | S |
|---|---|---|---|---|---|
| Theoretical: | 22.8 | 1.44 | 16.8 | 13.3 | 15.2 |
| Analyzed: | 23.3 | 1.70 | 15.3 | 11.9 | 15.1 |

Example II

To 0.3 ml. of aniline was added 5 ml. of 10% sodium hydroxide solution and 0.4 gm. of crude 5-uracilsulfonyl chloride. The resulting mixture was shaken vigorously for a period of 15 minutes, whereupon heat was evolved. Then, the mixture was cooled to room temperature and filtered. The filtrate thereupon obtained was acidified with concentrated hydrochloric acid. Upon chilling this acidified mixture a white precipitate was formed. This precipitate was separated from the supernatant liquid by filtration and dried. The dried product was identified as 5-uracilsulfonanilide and was obtained in the yield of 0.14 gm. having a melting point of 263–266° C. Upon recrystallizing this crude product from water the melting point thereof was raised to 267–268° C.

The analytical results obtained with this product on a formula basis of $C_{10}H_9N_3O_4S$, were as follows:

|  | C | H | N | S |
|---|---|---|---|---|
| Theoretical: | 44.9 | 3.39 | 15.7 | 12.0 |
| Analyzed: | 44.8 | 3.43 | 15.5 | 11.8 |

Example III

To 5 ml. of 40% aqueous dimethylamine was added, portion-wise, 1 gm. of 5-uracilsulfonyl chloride. The initial reaction of this mixture was extremely vigorous. After settling for a period of 10 to 15 minutes, the mixture was acidified with concentrated hydrochloric acid. Upon cooling this mixture crystals were formed which were separated from the supernatant liquid by filtration and dried. The dried product was identified as 5-(N,N-dimethylsulfamido)-uracil and was obtained in a yield of 0.25 gm. having a melting point, with decomposition, of 340–342° C.

The analytical results obtained with this product on a formula basis of $C_6H_9N_3O_4S$, were as follows:

|  | C | H | N | S |
|---|---|---|---|---|
| Theoretical | 32.9 | 4.14 | 19.2 | 14.6 |
| Analyzed | 33.0 | 4.05 | 19.0 | 14.5 |

Example IV

To 0.45 gm. of phenol, dissolved in 10 ml. of 5% sodium hydroxide solution, was added 1.1 gms. of 5-uracilsulfonyl chloride. The resulting mixture was shaken vigorously, then settled for a period of 15 minutes, and acidified with concentrated hydrochloric acid. The acidified solution formed crystals upon cooling, which crystals were separated from the supernatant liquid by filtration and dried. The dried product was identified as phenyl 5-uracilsulfonate and obtained in a yield of 0.3 gm. This product, upon recrystallization from water, had a melting point of 250–253° C.

The analytical results obtained with this product on a formula basis of $C_{10}H_8N_2O_5S$, were as follows:

|  | C | H | N | S |
|---|---|---|---|---|
| Theoretical | 44.8 | 3.01 | 10.4 | 11.9 |
| Analyzed: | 44.8 | 2.89 | 10.33 | 11.8 |

Example V

To 1 gm. of crude 5-uracilsulfonyl chloride was added 30 cc. of water, and the resulting mixture was heated to boiling. The pH of the boiled solution was adjusted to pH 7 with 10% sodium hydroxide solution, and the alkalinized solution was settled for a period of 30 minutes. Then, the solution was again heated to boiling, and 1.0 gm. of p-toluidine was added thereto, followed by 3 cc. of concentrated hydrochloric acid. Upon cooling the acidified solution, crystals formed therein, which were separated from the supernatant liquid by filtration. The separated crystals were recovered in the amount of 1.3 gms. This product was recrystallized from water, and was identified as p-toluidine 5-uracilsulfonate.

The analytical results obtained with this product on a formula basis of $C_{11}H_{13}N_3O_5S$, were as follows:

|  | C | H | N | S |
|---|---|---|---|---|
| Theoretical | 44.1 | 4.38 | 14.0 | 10.7 |
| Analyzed | 44.3 | 4.83 | 14.0 | 10.5 |

Example VI

To 45 gms. of uracil was added 240 cc. of chlorosulfonic acid. When the initial reaction had subsided, the reaction vessel was connected to a condenser and drying tube to protect the reaction mixture from the outside atmosphere. Then, the mixture was heated for at least 6 hours at a temperature in excess of 120° C.

To 1500 cc. of water, contained in a flask immersed in an ice-bath, was added 100 gms. of zinc dust. To this mixture was added 10 cc. of concentrated sulfuric acid to initiate the evolution of hydrogen gas.

The heated chlorosulfonation mixture was cooled to room temperature, and then added drop-wise to the zinc dust suspension at a rate such as to maintain the temperature of such suspension below 20° C. The mixture was stirred continuously during the addition step. After the addition had been completed, 50 gm. and 75 gm. portions of zinc dust were added, successively, and the resulting mixture was stirred at room temperature for several hours.

The precipitate formed in this mixture was separated from the supernatant liquid by filtration on a Buchner funnel, and such precipitate was washed with water. The bright yellow precipitate, containing zinc dust, was dissolved in 300–400 cc. of 5% sodium hydroxide solution, and the resulting solution was clarified by filtration. This filtrate was diluted to a volume of 1 liter and acidified with concentrated hydrochloric acid. The precipitate thereupon formed in the filtrate was separated from the supernatant liquid by filtration. This fine, yellow precipitate was dried, and the dried product obtained in a yield of 30 gms. This dried product was identified analytically as 5-mercaptouracil.

Example VII

To 6.4 gms. of 6-aminouracil was added 30 cc. of chlorosulfonic acid. After the initial vigorous reaction had subsided, a condenser and drying tube were attached to the reaction vessel to protect the reaction mixture from the outside atmosphere. Then, the reaction mixture was heated to a temperature in excess of 120° C. for a period of about 8 hours, in an oil bath. The heated mixture was cooled to room temperature, and thereafter poured over 150 gms. of crushed wet ice, while such ice was undergoing vigorous agitation. The light tan precipitate thereupon formed was separated from the supernatant liquid on a Büchner funnel. This precipitate was washed with ice water, and dried as completely as possible by pressing between absorbent paper. The precipitate was further dried under vacuum in a dessicator over potassium hydroxide pellets. This dehydrated solid was extracted with boiling acetone and precipitated with n-hexane. This precipitate, which was identified as 6-aminouracil-5-sulfonyl chloride, was obtained in a yield of 2.0 gms. This product began to decompose at a temperature of about 265° C., turning dark.

The analytical results obtained with this product, calculated on a formula basis of $C_4H_4N_3O_4SCl$, were as follows:

|  | C | H | N | S | Cl |
|---|---|---|---|---|---|
| Theoretical | 21.29 | 1.78 | 18.63 | 14.21 | 15.71 |
| Analyzed | 22.48 | 2.36 | 18.45 | 12.91 | 14.79 |

Example VIII

To 450 gms. of 6-aminouracil-5-sulfonyl chloride, which was obtained as a precipitate from an acetone solution mixed with n-hexane, was added 20 cc. of aniline. The resulting mixture was heated on a steam-bath for a period of 2 hours, whereupon a precipitate formed therein. Then, this precipitate was separated from the supernatant liquid by filtration. The supernatant liquid was subjected to vacuum distillation on a steam bath to separate excess aniline therefrom. The dark-colored residue thereupon obtained was extracted with boiling water. This aqueous extract was clarified by filtration, acidified by 1 N hydrochloric acid, and cooled in an ice-bath. A fine, crystalline material formed therein upon cooling, and such material was separated from the supernatant liquid by filtration on a Hirsch funnel.

This crystalline product was recrystallized from boiling water using activated charcoal to decolorize the solution. The recrystallized product was identified as 6-aminouracil-5-sulfonanilide, and obtained in a yield of 160 mgs. This product had a melting point of 259–260° C., turning dark.

While in the foregoing specification, the novel compounds and method of this invention have been described in considerable detail by reference to specific embodiments thereof, it will be apparent to those skilled in the art that this invention is susceptible to other embodiments and that many of the details set forth herein can be varied widely without departing from the basic concept and spirit of the invention.

We claim:

1. 5-uracilsulfonyl chloride.
2. The method which comprises condensing a compound selected from the group consisting of uracil and 6-aminouracil with a halosulfonic acid to obtain the corresponding 5-sulfonylhalide.
3. The method of claim 2 in which said halosulfonic acid is chlorosulfonic acid.
4. The method which comprises condensing a compound selected from the group consisting of uracil and 6-aminouracil and a halosulfonic acid to obtain the corresponding 5-sulfonylhalide, said halosulfonic acid being employed in a ratio of at least 5 moles per mole of said compound.
5. The method which comprises condensing a compound selected from the group consisting of uracil and 6-aminouracil with chlorosulfonic acid to obtain the corresponding 5-sulfonylchloride, said chlorosulfonic acid being employed in a ratio of from 9 to 11 moles per mole of said compound and the reaction being carried out at a temperature of at least 60° C.

References Cited in the file of this patent

Karrer: Organic Chemistry, 2nd Ed., Elsevier, New York, 1946, pages 406–407.

Fieser and Fieser: Organic Chemistry, page 628, 2nd Ed. (1950).

Greenbaum: Journ. Am. Chem. Soc., vol. 76, pages 6052–54 (1954).

Greenbaum: Journ. Am. Chem. Soc., vol. 76, pages 2899–2902 (1954).